United States Patent
Wilkins et al.

(10) Patent No.: US 11,503,090 B2
(45) Date of Patent: Nov. 15, 2022

(54) REMOTE AUDIENCE FEEDBACK MECHANISM

(71) Applicant: AT&T Intellectual Property I, L.P., Atlanta, GA (US)

(72) Inventors: Wiley Wilkins, Ivanhoe, TX (US); James H. Pratt, Round Rock, TX (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/106,835

(22) Filed: Nov. 30, 2020

(65) Prior Publication Data

US 2022/0174099 A1    Jun. 2, 2022

(51) Int. Cl.
*H04L 65/403* (2022.01)
*G06V 40/16* (2022.01)

(52) U.S. Cl.
CPC .......... *H04L 65/403* (2013.01); *G06V 40/174* (2022.01)

(58) Field of Classification Search
CPC ....... H04L 65/403; H04L 65/60; H04L 67/10; G06K 9/00302; H04N 21/25; H04N 21/2668; H04N 21/46
USPC ........................................................ 709/204
See application file for complete search history.

(56) References Cited

U.S. PATENT DOCUMENTS

| | | |
|---|---|---|
| 7,263,550 B1 | 8/2007 | Peiffer |
| 8,327,395 B2 | 12/2012 | Lee et al. |
| 8,660,895 B1 | 2/2014 | Saurabh et al. |
| 8,826,350 B1 | 9/2014 | Maeng |
| 8,918,330 B1 | 12/2014 | Winkler |
| 8,978,055 B1 | 3/2015 | Sudo et al. |
| 9,031,382 B1 | 5/2015 | Kaiser |
| 9,055,312 B2 | 6/2015 | Civanlar |
| 9,137,558 B2 | 9/2015 | Gibbon |
| 9,288,387 B1 | 3/2016 | Keller |
| 9,973,819 B1 | 5/2018 | Taylor et al. |
| 10,134,048 B2 | 11/2018 | Deephanphongs et al. |
| 10,162,543 B1 | 12/2018 | Patel et al. |
| 10,187,690 B1 | 1/2019 | Garcia et al. |
| 10,187,694 B2 | 1/2019 | Meredith et al. |
| 10,225,608 B2 | 3/2019 | Shigeta et al. |
| 10,440,436 B1 | 10/2019 | Taylor et al. |
| 10,491,459 B1 | 11/2019 | Andreas et al. |
| 10,904,615 B2 | 1/2021 | Boss et al. |
| 10,911,829 B2 | 2/2021 | el Kaliouby et al. |
| 11,010,797 B2 | 5/2021 | Dow et al. |

(Continued)

*Primary Examiner* — Glenford J Madamba

(57) ABSTRACT

An example method includes presenting a remote broadcast event by delivering content from a first user endpoint device to a plurality of user endpoint devices of a plurality of audience members, estimating reactions of the audience members, based on streams of data received from the plurality of user endpoint devices, grouping the audience members into a plurality of groups, based on the reactions, wherein each group of the plurality of groups is associated with a different reaction, and wherein each audience member who is a member of the each group was estimated to demonstrate a common reaction of the plurality of reactions, wherein the common reaction is associated with the each group, selecting, for a first group, a first audience member from the first group to be representative of the first group, and presenting, to the first user endpoint device, an image of the first audience member.

20 Claims, 4 Drawing Sheets

(56) References Cited

U.S. PATENT DOCUMENTS

| | | |
|---|---|---|
| 11,012,719 B2 | 5/2021 | Mickelsen |
| 11,153,109 B2 | 10/2021 | Kwatra et al. |
| 11,336,968 B2 | 5/2022 | Sonare et al. |
| 2005/0289582 A1 | 12/2005 | Tavares et al. |
| 2008/0039197 A1 | 2/2008 | Walker et al. |
| 2009/0027337 A1 | 1/2009 | Hildreth |
| 2009/0089840 A1 | 4/2009 | Shusman |
| 2009/0094628 A1 | 4/2009 | Lee et al. |
| 2009/0131764 A1 | 5/2009 | Lee |
| 2009/0133051 A1 | 5/2009 | Hildreth |
| 2009/0138805 A1 | 5/2009 | Hildreth |
| 2009/0249223 A1 | 10/2009 | Barsook et al. |
| 2010/0017474 A1 | 1/2010 | Kandekar et al. |
| 2012/0072420 A1 | 3/2012 | Moganti et al. |
| 2012/0257112 A1 | 10/2012 | Fritsch |
| 2012/0278179 A1 | 11/2012 | Campbell et al. |
| 2012/0278331 A1* | 11/2012 | Campbell ........ H04N 21/44204 707/740 |
| 2013/0076853 A1 | 3/2013 | Diao |
| 2013/0093897 A1 | 4/2013 | Fan et al. |
| 2013/0132515 A1 | 5/2013 | Mostafa et al. |
| 2013/0205314 A1 | 8/2013 | Ramaswamy et al. |
| 2013/0298146 A1 | 11/2013 | Conrad et al. |
| 2013/0346867 A1 | 12/2013 | Woods et al. |
| 2014/0007147 A1 | 1/2014 | Anderson |
| 2014/0025688 A1 | 1/2014 | Andler et al. |
| 2014/0040039 A1 | 2/2014 | Gates et al. |
| 2014/0067828 A1 | 3/2014 | Archibong et al. |
| 2014/0068692 A1 | 3/2014 | Archibong et al. |
| 2014/0081954 A1 | 3/2014 | Elizarov |
| 2014/0150002 A1 | 5/2014 | Hough et al. |
| 2014/0168056 A1 | 6/2014 | Swaminathan et al. |
| 2015/0066964 A1 | 3/2015 | Makino et al. |
| 2015/0110471 A1 | 4/2015 | Zheng |
| 2015/0244747 A1 | 8/2015 | Wickenkamp et al. |
| 2016/0006981 A1 | 1/2016 | Bauman et al. |
| 2016/0021412 A1 | 1/2016 | Zito, Jr. |
| 2016/0057497 A1* | 2/2016 | Kim ................... H04N 21/4542 725/10 |
| 2016/0134938 A1* | 5/2016 | Miyazaki ................. H04N 7/15 348/14.07 |
| 2016/0344873 A1 | 11/2016 | Jenzeh et al. |
| 2016/0366203 A1* | 12/2016 | Blong .................... H04L 51/32 |
| 2016/0366464 A1 | 12/2016 | Rouady et al. |
| 2016/0381427 A1 | 12/2016 | Taylor et al. |
| 2017/0006322 A1 | 1/2017 | Dury et al. |
| 2017/0083831 A1 | 3/2017 | Ghosh et al. |
| 2017/0103672 A1 | 4/2017 | Dey et al. |
| 2017/0127104 A1 | 5/2017 | Thomas et al. |
| 2017/0195629 A1 | 7/2017 | Wexler et al. |
| 2017/0264920 A1 | 9/2017 | Mickelsen |
| 2017/0295402 A1 | 10/2017 | Courouge et al. |
| 2018/0101149 A1 | 4/2018 | Moss et al. |
| 2018/0183874 A1 | 6/2018 | Cook |
| 2018/0233145 A1 | 8/2018 | Bathiche et al. |
| 2018/0350144 A1 | 12/2018 | Rathod |
| 2018/0376187 A1 | 12/2018 | Everett |
| 2019/0075359 A1 | 3/2019 | Boss et al. |
| 2019/0147185 A1 | 5/2019 | Cai et al. |
| 2019/0182329 A1 | 6/2019 | Moss |
| 2019/0321727 A1 | 10/2019 | Rodgers |
| 2020/0053312 A1 | 2/2020 | Mukherjee et al. |
| 2020/0059703 A1 | 2/2020 | Sonare et al. |
| 2020/0075162 A1 | 3/2020 | Kovalan |
| 2020/0081591 A1 | 3/2020 | Karri et al. |
| 2020/0169787 A1 | 5/2020 | Pearce et al. |
| 2020/0230499 A1 | 7/2020 | Busser et al. |
| 2020/0275171 A1 | 8/2020 | Cloud et al. |
| 2020/0288204 A1 | 9/2020 | Duersch et al. |
| 2020/0401370 A1 | 12/2020 | Shetty et al. |
| 2021/0029391 A1 | 1/2021 | Choudhari et al. |
| 2021/0029406 A1 | 1/2021 | Kumar et al. |
| 2021/0264908 A1 | 8/2021 | Nagar et al. |

* cited by examiner

US 11,503,090 B2

REMOTE AUDIENCE FEEDBACK MECHANISM

The present disclosure relates generally to media distribution, and relates more particularly to devices, non-transitory computer-readable media, and methods for providing feedback from a remote audience in a manner that simulates live audience feedback.

BACKGROUND

Remote broadcast technology, such as video conferencing, has emerged as a viable means of implementing events (particularly large-scale events) in a socially distanced manner. For instance, events such as concerts, theatrical performances, meetings, classes, tours, and professional conferences can be rendered as experiences in which each participant joins remotely rather than in-person, with minimal detriment to the audience experience.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
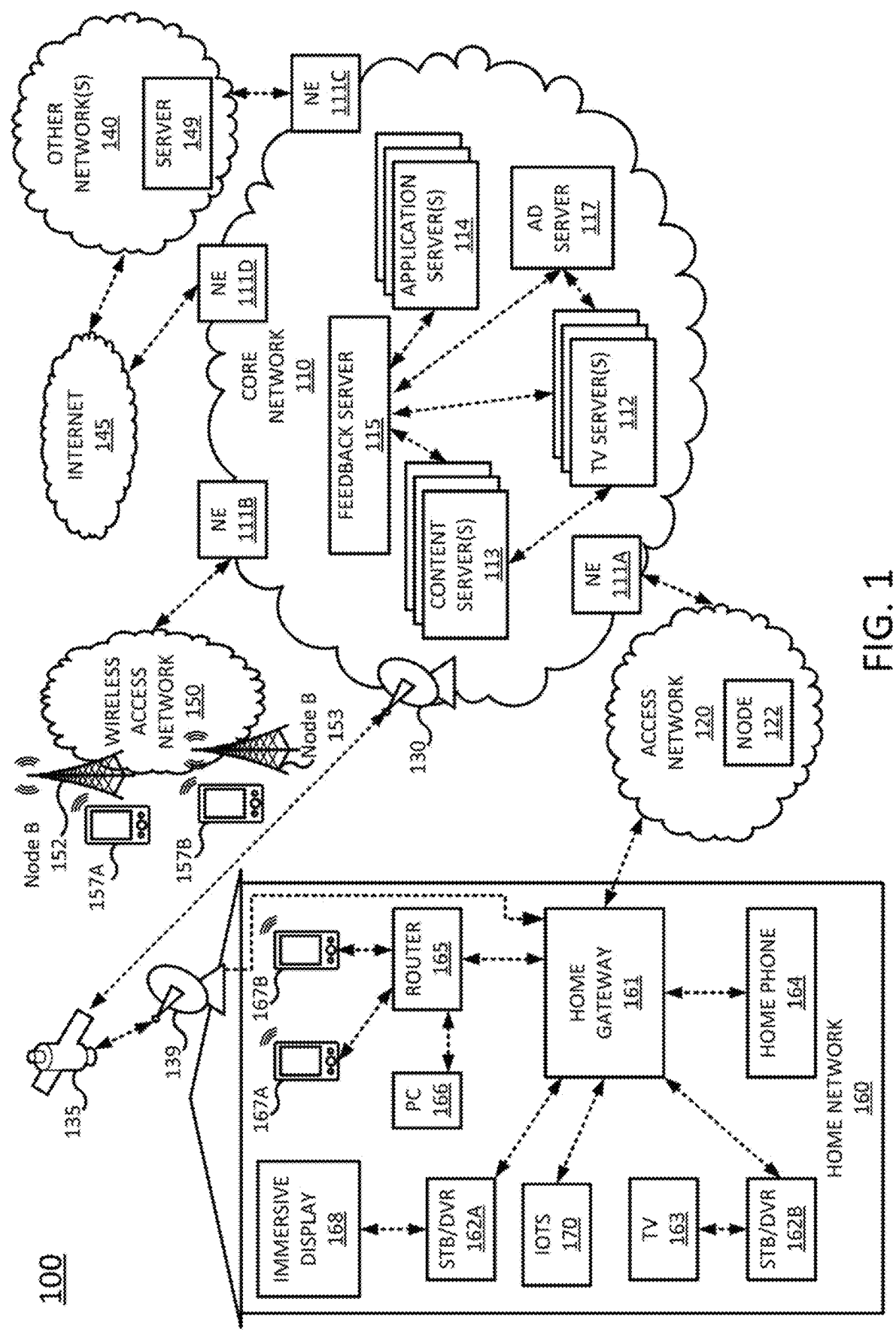
FIG. 1 illustrates an example system in which examples of the present disclosure for providing feedback from a remote audience in a manner that simulates live audience feedback may operate.

The present disclosure broadly discloses methods, computer-readable media, and systems for providing feedback from a remote audience in a manner that simulates live audience feedback. In one example, a method performed by a processing system includes presenting a remote broadcast event by delivering content from a first user endpoint device of an event host to a plurality of user endpoint devices of a plurality of audience members, estimating a plurality of reactions of the plurality of audience members, based on streams of data received from the plurality of user endpoint devices, grouping the plurality of audience members into a plurality of groups, based on the plurality of reactions, wherein each group of the plurality of groups is associated with a different reaction of the plurality of reactions, and wherein each audience member of the plurality of audience members who is a member of the each group was estimated to demonstrate a common reaction of the plurality of reactions, wherein the common reaction is associated with the each group, selecting, for a first group of the plurality of groups, a first audience member from the first group to be representative of the first group, and presenting, to the first user endpoint device, an image of the first audience member.

In another example, a non-transitory computer-readable medium may store instructions which, when executed by a processing system in a communications network, cause the processing system to perform operations. The operations may include presenting a remote broadcast event by delivering content from a first user endpoint device of an event host to a plurality of user endpoint devices of a plurality of audience members, estimating a plurality of reactions of the plurality of audience members, based on streams of data received from the plurality of user endpoint devices, grouping the plurality of audience members into a plurality of groups, based on the plurality of reactions, wherein each group of the plurality of groups is associated with a different reaction of the plurality of reactions, and wherein each audience member of the plurality of audience members who is a member of the each group was estimated to demonstrate a common reaction of the plurality of reactions, wherein the common reaction is associated with the each group, selecting, for a first group of the plurality of groups, a first audience member from the first group to be representative of the first group, and presenting, to the first user endpoint device, an image of the first audience member.

In another example, a device may include a processing system including at least one processor and non-transitory computer-readable medium storing instructions which, when executed by the processing system when deployed in a communications network, cause the processing system to perform operations. The operations may include presenting a remote broadcast event by delivering content from a first user endpoint device of an event host to a plurality of user endpoint devices of a plurality of audience members, estimating a plurality of reactions of the plurality of audience members, based on streams of data received from the plurality of user endpoint devices, grouping the plurality of audience members into a plurality of groups, based on the plurality of reactions, wherein each group of the plurality of groups is associated with a different reaction of the plurality of reactions, and wherein each audience member of the plurality of audience members who is a member of the each group was estimated to demonstrate a common reaction of the plurality of reactions, wherein the common reaction is associated with the each group, selecting, for a first group of the plurality of groups, a first audience member from the first group to be representative of the first group, and presenting, to the first user endpoint device, an image of the first audience member.

As discussed above, remote broadcast technology, such as video conferencing, has emerged as a viable means of implementing events (particularly large-scale events) in a socially distanced manner. For instance, events such as concerts, theatrical performances, meetings, classes, tours, and professional conferences can be rendered as experiences in which each participant joins remotely rather than in-person, with minimal detriment to the audience experience. From the perspective of the event host (e.g., presenter or performer), however, there may be drawbacks to the remote experience. For instance, it is harder for the host to gauge audience feedback or engagement. Typical solutions implemented in video conferencing applications tend to alternate between views of random audience members on the host's display, or to simultaneously show many small images of different audience members, but this may not give a true measure of the aggregate audience response.

Examples of the present disclosure monitor the reactions of audience members during a live, remote broadcast and process these reactions in order to provide the host (e.g., presenter or performer) of the remote broadcast event with real time audience feedback, just as the host would receive if he or she were presenting in front of an in-person audience. This may help the host to feel more connected (and, potentially, more comfortable) with the audience, to better gauge the audience's reaction to the material being presented, and/or to adapt the presentation to the audience's reactions to improve engagement.

Although examples of the present disclosure are discussed within the context of remote broadcast events, e.g., events where all or most of the participants are participating virtually (broadly a remote audience), from geographically distributed locations (e.g., physically remote from the host conducting the broadcast event), it will be appreciated that the examples discussed herein could also be used to provide feedback from in-person audiences (broadly a live audience), or a combination of both remote audience and live audience. For instance, certain events, like conference presentations, stand-up comedy shows, and the like, may take place in an environment that is at least partially darkened or dimly lit. Thus, even though the audience and the host are in the same location, it may be difficult for the host to see much of the audience in order to gauge reactions. For instance, the host may only be able to see the first few rows of the audience in a large, full-capacity theater, or may not be able to see any of the audience at all.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163, home phone 164, router 165, personal computer (PC) 166, immersive display 168, and so forth, with one another and with various other devices via a core network 110, a wireless access network 150 (e.g., a cellular network), an access network 120, other networks 140 and/or the Internet 145. In some examples, not all of the mobile devices and home network devices will be utilized in presenting a remote broadcast event. For instance, in some examples, presentation of a remote broadcast event may make use of the home network devices (e.g., immersive display 168, STB/DVR 162A, and/or Internet of Things devices (IoTs) 170), and may potentially also make use of any co-located mobile devices (e.g., mobile devices 167A and 167B), but may not make use of any mobile devices that are not co-located with the home network devices (e.g., mobile devices 157A and 157B).

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a wearable smart device (e.g., a smart watch or fitness tracker), a gaming console, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and an feedback server 115 (e.g., an application server). For ease of illustration, various additional elements of core network 110 are omitted from FIG. 1.

In one example, feedback server 115 may monitor audience members' reactions to a remote broadcast event, which may be delivered to a plurality of user endpoint devices, including a device in the home network 160 (e.g., one or more of the mobile devices 157A, 157B, 167A, and 167B, the PC 166, the home phone 164, the TV 163, the immersive display 168, and/or the Internet of Things devices (IoTs) 170) by the TV servers 112, the content servers 113, the application servers 114, the ad server 117, and/or and feedback server 115. For instance, the feedback server 115 may receive data related to the audience members' reactions directly from the device(s) to which the remote broadcast event is delivered (e.g., the devices presenting the remote broadcast events to the audience members). The data may include, e.g., sensor readings from one or more sensors of the device to which the remote broadcast event is delivered (e.g., cameras, microphones, biometric sensors, etc.). The data may be received by the feedback server 115 in real time, e.g., as the sensors collect the data. The feedback server 115 may alternatively or in addition receive the data from other devices in the vicinity of the device(s) to which the remote broadcast event is being delivered. For instance, the data could be collected by one or more IoT devices (e.g., a virtual assistant device, a security system, an image capturing system, etc.), by the user's mobile phone or wearable smart device (e.g., smart watch or fitness tracker), or the like.

The feedback server 115 may analyze the data in real time (e.g., as the data is received) in order to estimate the audience's current reaction to and engagement with the remote broadcast event. The feedback server 115 may estimate the audience's reactions in a variety of ways. For instance, the feedback server 115 could perform image processing on camera images of the audience members (e.g., facial analysis of images of the audience members' face, or image analysis of the audience members' body language, could yield clues as to the audience's reactions or levels of engagement). Alternatively, the feedback server 115 could perform a content analysis on audio signals of the audience members (e.g., the audience's reactions could be indicated by laughing, yawning, cheering, etc.; sentiment analysis may be performed on utterances made by the audience members, such as statements of boredom, interest, or the like). In another example, the feedback server could perform a sentiment analysis on text-based messages exchanged by the audience members (e.g., messages to other audience members asking for clarification or discussing unrelated topics). In further examples, the feedback server 115 may perform an analysis of biometric indicators of the audience members in order to estimate the audience's reactions (e.g., readings from an audience member's fitness tracker may indicate that the audience member has fallen asleep, indicating a lack of interest or engagement).

In response to the estimating the audience's reactions or engagement, the feedback server 115 may select and transmit evidence of the audience reactions to a user endpoint device operated by the host of the remote broadcast event. For instance, the feedback server 115 may transmit live/video images of the audience members who are estimated to be the most engaged and/or least engaged in the remote broadcast event, so that the host has a view to the audience reactions just as he would have during an in-person event. In another example, the feedback server 115 could aggregate the estimated reactions of multiple audience members in order to provide an estimate of an aggregate audience reaction (e.g., is most of the audience engaged, bored, etc.). Aggregated and/or individual reactions could be displayed to the host as graphics (e.g., bar charts or the like) to show the engagement of the audience (in general, or specific members) at specific times, over time, and the like. In a further example, aggregation of audience reactions could result in the generation of a plurality of different groups of audience members, who are grouped according to reaction. For instance, a first group might contain audience members who appear to be engaged, a second group might contain audience members who appear to be bored, a third group might contain audience members who appear to be confused, and so on. Representative members of these groups could be selected for presentation to the event host as described in greater detail below.

In a further example, the feedback server 115 may use gaze tracking techniques to detect audience members who are looking directly at the displays of their user endpoint devices. The feedback server 115 may choose to provide live video feeds of one or more audience members who are looking directly at their displays to the host, thereby giving the host the opportunity to virtually "make eye contact" with audience members and increase the host's sense of engagement with the audience.

The feedback server 115 may also have access to third party data sources (e.g., server 149 in other network 140), where the third party data sources may comprise historical, background and other data relating to the types of audience reactions that are expected or typical for different types of remote broadcast events. For instance, an audience member who appears to be dozing off might be expected during a virtual yoga class, but not during a virtual college lecture.

The feedback server 115 may interact with television servers 112, content servers 113, and/or advertising server 117, to select which video programs (or other content), advertisements, and/or feedback to include in a remote broadcast event being delivered to a user endpoint device. For instance, the content servers 113 may store scheduled television broadcast content for a number of television channels, video-on-demand programming, local programming content, gaming content, and so forth. The content servers 113 may also store other types of media that are not audio/video in nature, such as audio-only media (e.g., music, audio books, podcasts, or the like) or video-only media (e.g., image slideshows). For example, content providers may upload various contents to the core network to be distributed to various subscribers. Alternatively, or in addition, content providers may stream various contents to the core network for distribution to various subscribers, e.g., for live content, such as news programming, sporting events, and the like. In one example, advertising server 117 stores a number of advertisements that can be selected for presentation to subscribers, e.g., in the home network 160 and at other downstream viewing locations. For example, advertisers may upload various advertising content to the core network 110 to be distributed to various viewers.

Figure 4:
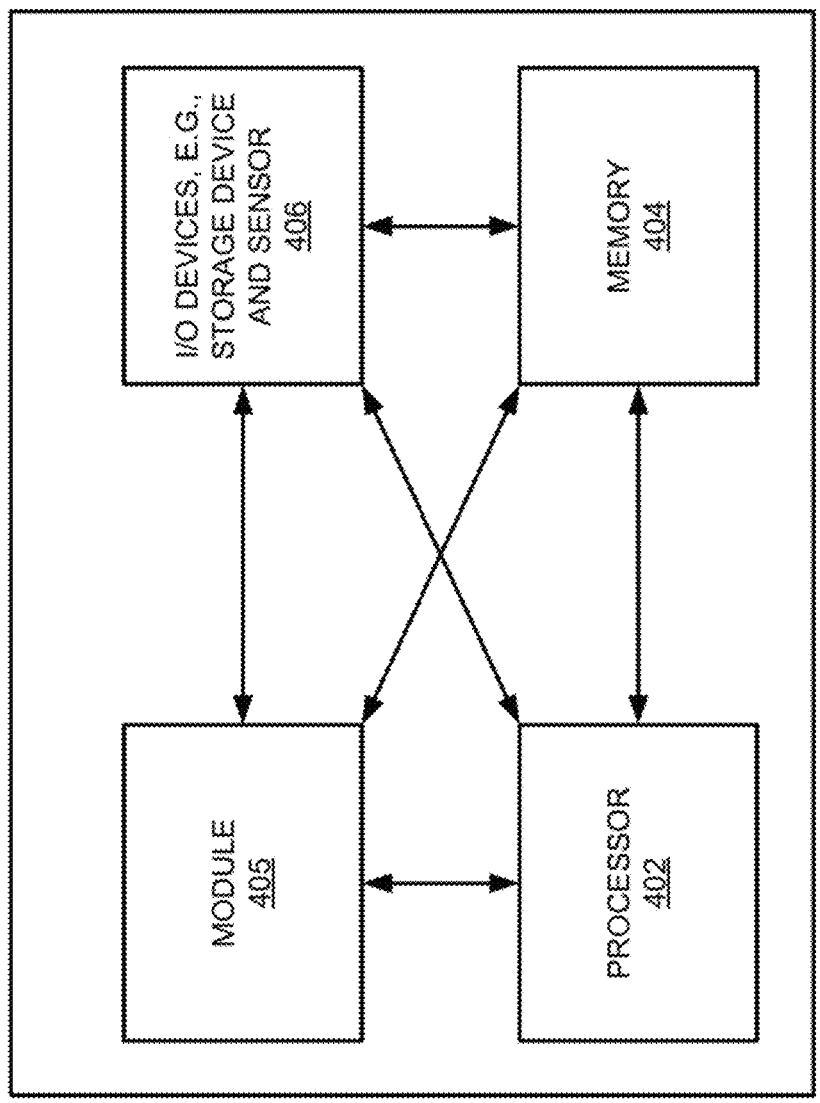
FIG. 4 illustrates an example of a computing device, or computing system, specifically programmed to perform the steps, functions, blocks, and/or operations described herein.

In one example, any or all of the television servers 112, content servers 113, application servers 114, feedback server 115, and advertising server 117 may comprise a computing system, such as computing system 400 depicted in FIG. 4.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163 and/or immersive display 168 for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A and 167B, IoTs 170 and so forth.

In one example, router 165 may further communicate with TV (broadly a display) 163 and/or immersive display 168, e.g., where one or both of the television and the immersive display incorporates "smart" features. The immersive display may comprise a display with a wide field of view (e.g., in one example, at least ninety to one hundred degrees). For instance, head mounted displays, simulators, visualization systems, cave automatic virtual environment (CAVE) systems, stereoscopic three dimensional displays, and the like are all examples of immersive displays that may be used in conjunction with examples of the present disclosure. In other examples, an "immersive display" may also be realized as an augmentation of existing vision augmenting devices, such as glasses, monocles, contact lenses, or devices that deliver visual content directly to a user's retina (e.g., via mini-lasers or optically diffracted light). In further examples, an "immersive display" may include visual patterns projected on surfaces such as windows, doors, floors, or ceilings made of transparent materials.

In another example, the router 165 may further communicate with one or more IoTs 170, e.g., a connected security system, an automated assistant device or interface, a connected thermostat, a connected speaker system, or the like. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163 and/or immersive display 168, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
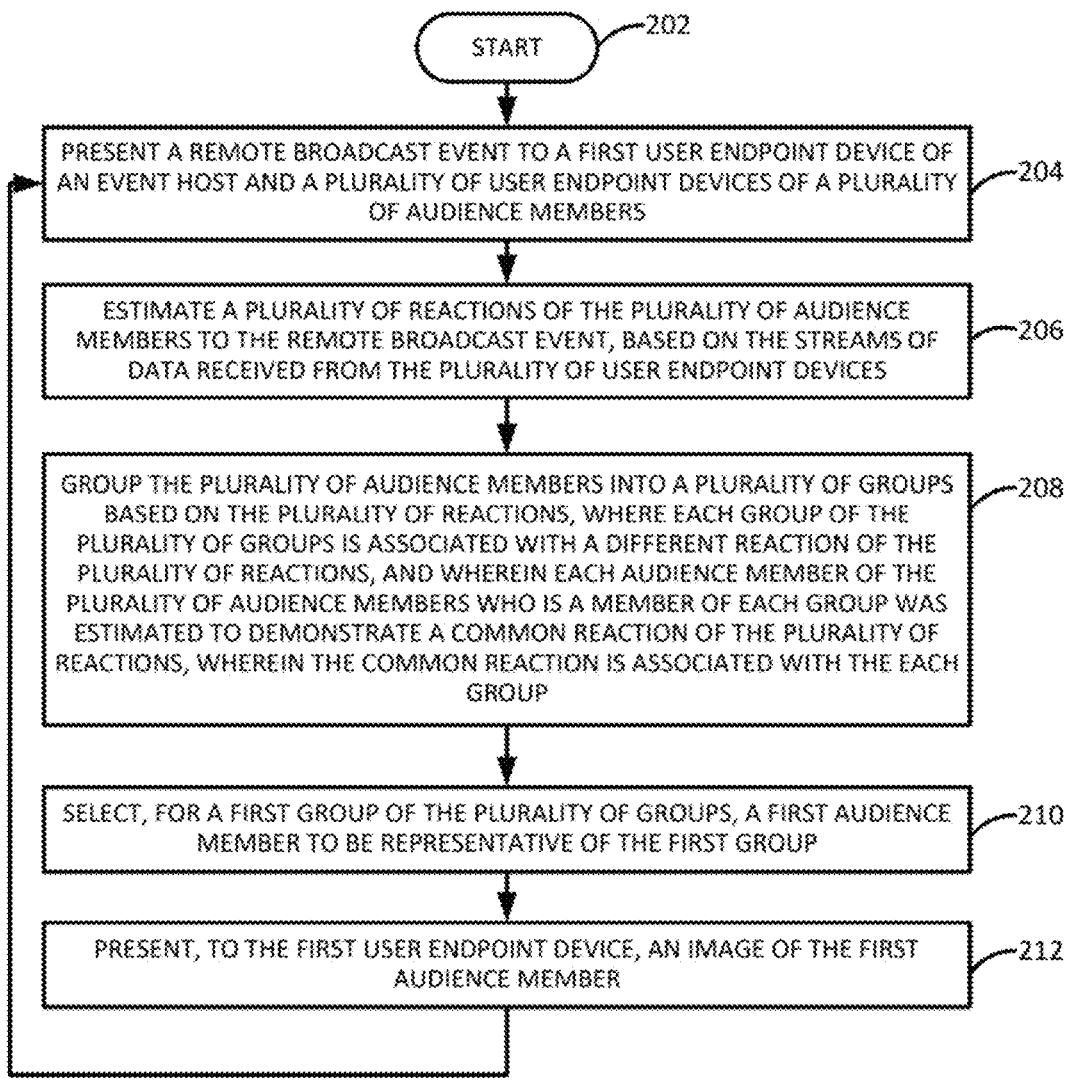
FIG. 2 illustrates a flowchart of an example method for providing feedback from a remote audience in a manner that simulates live audience feedback, in accordance with the present disclosure.

FIG. 2 illustrates a flowchart of an example method 200 for providing feedback from a remote audience in a manner that simulates live audience feedback, in accordance with the present disclosure. In one example, steps, functions and/or operations of the method 200 may be performed by a device as illustrated in FIG. 1, e.g., feedback server 115 or any one or more components thereof. In one example, the steps, functions, or operations of method 200 may be performed by a computing device or system 400, and/or a processing system 402 as described in connection with FIG. 4 below. For instance, the computing device 400 may represent at least a portion of the feedback server 115 in accordance with the present disclosure. For illustrative purposes, the method 200 is described in greater detail below in connection with an example performed by a processing system, such as processing system 402.

The method 200 begins in step 202. In step 204, the processing system may present a remote broadcast event to a first user endpoint device of an event host (e.g., a user endpoint device operated by a host, such as a presenter or performer, of the remote broadcast) and a plurality of user endpoint devices of a plurality of audience members (e.g., user endpoint devices operated by members of the audience of the remote broadcast). The first user endpoint device and the plurality of user endpoint devices may be geographically distributed (i.e., in different geographic locations), or the host and a majority of the members of the audience may be in the same geographic location, but conditions (such as dim lighting, obstructions, etc.) may prevent the host from seeing many of the members of the audience. Thus, the remote broadcast may include a plurality of participants including a host and a plurality of audience members. The first user endpoint device and the plurality of user endpoint devices may include any types of devices that are capable of presenting a remote broadcast event (e.g., a video conferring or similar event), either alone or in combination with other devices. For instance, a user endpoint device may comprise an immersive display, such as a head mounted display, a stereoscopic three-dimensional display, or the like. A user endpoint device may also comprise a more conventional display, such as a television, a tablet computer, or the like, that is co-located (e.g., in the same room as) with one or more IoT devices, such as a smart thermostat, a smart lighting system, a smart audio system, a virtual assistant device, or the like.

In another example, the members of the audience may be displayed across a large physical area (e.g., through an immersive device, ubiquitous full-room displays, or holographic projections) such that the host can move a significant distance between representations of members of the audience. In this example, the system may then emulate the feeling and placement of an audience in an in-person venue even though one or more of the members of the audience may be geographically distributed in locations that are different from the location of the host. A likeness of each member of the audience may be displayed using only facial images (e.g., cropped from larger images), a computer-generated stand-in image (e.g., an avatar), or a graphical notation derived from subsequent processing steps 208 and 210, described in further detail below.

The remote broadcast event may be presented in accordance with any known techniques for presenting multi-participant video conferencing. For instance, the processing system may collect audio and video data from the first user endpoint device and the plurality of user endpoint devices. Each user endpoint device may include at least a camera to collect video data of the associated participant (i.e., host or audience member) and a microphone to collect audio data of the associated participant. Each user endpoint device may therefore send a stream of data to the processing system that includes video and/or audio data of the associated participant (which may be compressed for delivery to the processing system and decompressed upon receipt by the processing system).

The processing system may mix the video and/or audio data from the different user endpoint device streams and deliver, to each user endpoint device (of the first user endpoint device and the plurality of user endpoint devices), a (possibly compressed) mixed stream that displays, in some way, the participants associated with the other user endpoint devices. For instance, in one example, the remote broadcast event may comprise an event having a plurality of audience members, such as a class, a conference, a concert or theatrical performance, a tour, or a meeting. Thus, when presented with the remote broadcast event, a device operated by an audience member (e.g., a device in the plurality of user endpoint devices) may display an image of the host and play audio of the host, and optionally may also display images of one or more of the other audience members. A device operated by the host (e.g., the first user endpoint device) may display images of several audience members, but may or may not play audio of the audience members.

In step 206, the processing system may estimate a plurality of reactions of the plurality of audience members to the remote broadcast event, based on the streams of data received from the plurality of user endpoint devices. In one example, audience members may opt-in (e.g., providing consent) for the monitoring and estimating of their reactions in order to avoid intruding on their privacy. In a further example, the opt-in may include an enrollment or training process (e.g., performed prior to presentation of the remote broadcast event) in which the processing system may present various types of material to an opted-in audience member in order to determine the signs of different reactions that are specific to the audience member (e.g., laughter in combination with some other indicators, such as fidgeting, may indicate that the audience member is nervous rather than amused).

In one example, the estimating may comprise performing image processing on the video components of the streams of data in order to estimate the individual reactions of the audience members. Machine learning techniques could be used to infer meaning from data that is extracted as a result of the processing. For instance, the processing system may be trained to recognize indicators for certain types of sentiments or reactions. In addition, by continuously monitoring audience member reactions during remote broadcast events, the processing system may learn to recognize new indicators.

For instance, in one example, the image processing techniques may comprise techniques that detect and/or track one or more facial features or gestures of an audience member. As an example, a gaze tracking technique could be used to detect an audience member's eyes and then to track the audience member's eye movements to detect a direction of the audience member's gaze. By tracking the audience member's gaze, the processing system may be able to determine whether the audience member is paying attention to the remote broadcast event (e.g., whether the audience member is engaged). For instance, if the audience member is looking at the display of his user endpoint device, then the processing system may infer that the audience member is paying attention to the remote broadcast event. However, if the audience member is looking away from the display of his user endpoint device (e.g., is looking at his phone) for more than a threshold period of time (e.g., more than x seconds), then the processing system may infer that the audience member is not paying attention to the remote broadcast event (e.g., is not engaged or is distracted or bored).

In another example, a facial feature detection technique could be used to detect the audience member's mouth and then to infer a sentiment of the audience member from movements of the audience member's mouth. For instance, if the audience member is smiling or laughing, then the processing system may infer that the audience member is reacting positively to the remote broadcast event. If the audience member is frowning, then the processing system may infer that the audience member is reacting negatively to the remote broadcast event. If the audience member's mouth is moving, this may indicate that the audience member is talking, and the processing system may infer that the audience member is not paying attention to the remote broadcast event. Other movements and facial expressions could be mapped to other sentiments (e.g., furrowed eyebrows could indicate confusion, wide eyes could indicate surprise, laughing could indicate amusement, etc.).

In another example, an object detection and recognition technique could be used to detect any objects, people, or the like in the audience member's vicinity which may be possible sources of distraction. For instance, if the audience member is holding a phone up to his ear, then the processing system may infer that the audience member is talking on his phone or listening to voice messages, and is therefore distracted (or not engaged/paying attention). Similarly, if the audience member appears to be talking to a child, then the processing system may infer that the audience member is distracted.

In another example, the estimating may comprise performing audio processing on the audio components of the streams of data in order to estimate the individual reactions of the audience members. For instance, sound recognition techniques could be used to detect when an audience member is laughing, from which the processing system may infer that the audience member is amused by or is responding positively to the remote broadcast event. In another example, sound recognition techniques could be used to detect when the audience member is talking, from which the processing system may infer that the audience member is not paying attention to the remote broadcast event. In another example, speech recognition and/or sentiment analysis may be used to detect words spoken by the audience member and sentiments expressed by those words, from which the processing system may be able to more explicitly infer a reaction of the audience member (e.g., "How much longer is this?," "This guy is hilarious," "I don't get it," etc.).

In another example, the estimating may comprise performing text analysis on text components of the streams of data in order to estimate the individual reactions of the audience members. For instance, sentiment analysis techniques could be performed on text messages that audience members are exchanging via a chat feature of the remote broadcast event in order to detect different sentiments expressed by the text messages and/or the audience members who expressed the different sentiments (e.g., "I don't understand, do you?," "Did you hear what he just said?," etc.).

In one example, estimation of audience reactions may be calibrated to the type of the remote broadcast event being presented. Different types and levels of feedback may be expected or desirable based on the nature of the remote broadcast event. For instance, during a presentation of a virtual professional conference, a quiet, composed audience might be interpreted as a sign that the audience is paying attention; however, during a virtual stand-up comedy show, a quiet, composed audience could be a sign that the jokes are falling flat. Machine learning techniques can be used to learn, for each type of remote broadcast event, what types of audience reactions are desirable or expected and what types of audience reactions are undesirable or unexpected.

In step 208, the processing system may group the plurality of audience members into a plurality of groups based on the plurality of reactions, where each group of the plurality of groups is associated with a different reaction of the plurality of reactions, and wherein each audience member of the plurality of audience members who is a member of each group was estimated to demonstrate a common reaction of the plurality of reactions, wherein the common reaction is associated with the each group. In other words, the processing system may create a plurality of reaction-based groups with each group having an associated common reaction for that particular group, such as an engaged group (e.g., each member assigned to this group exhibiting an "engaged common reaction"), a distracted group (e.g., each member assigned to this group exhibiting a "distracted common reaction"), a confused group (e.g., each member assigned to this group exhibiting a "confused common reaction"), a bored group (e.g., each member assigned to this group exhibiting a "bored common reaction"), and the like, and may assign each audience member to the group that is most closely aligned with the estimated reaction of the audience member. Thus, all members of the "engaged" group would be audience members who the processing system estimated are engaged, all members of the "distracted" group would be audience members who the processing system estimated are distracted, and so on. In one example, the groups could be pre-defined, such that audience members are sorted into the predefined groups that most closely match their estimated reactions. In another example, the groups could be defined dynamically based on the reactions that are detected among the audience members (e.g., using one or more clustering techniques).

In step 210, the processing system may select, for a first group of the plurality of groups, a first audience member to be representative of the first group. For instance, for one or more of the groups that were created in step 208, the processing system may choose a representative member of that group. The representative member may be chosen in any way. For instance, the representative member could be chosen randomly. The representative member could also be chosen as the member whose reaction exemplifies the most extreme (or most emotive) reaction among the group. For instance, for a group that is "amused," the representative member might be the member who is laughing the hardest; for a group that is "bored," the representative member may be a member who is asleep; etc. Choosing the member with the most extreme reaction may help to more easily distinguish between groups based on representative members (and may help to more easily determine the group that is represented). For instance, the difference between a person who is laughing hard and a person who is sleeping may be more immediately apparent than the difference between a person who is smiling slightly and a person who is looking at his watch. Thus, in step 210, the processing system may optionally also select additional representative members for additional groups besides the first group (e.g., at least a second audience member from a second group to be representative of the second group).

In another example, the host may specifically "pin" an image of one or more audience members from a group of images that is displayed. After the "pin" action is executed, the processing system may bias the selection of future displays to the pinned audience members when the group to which the audience member belongs is detected. With this capability, the host may explicitly indicate audience members of interest as VIPs, individuals who are particularly engaging, or even audience members who may act in an assistive capacity to cue, coach, or guide the host during the event.

In step 212, the processing system may present, to the first user endpoint device, an image of the first audience member (i.e., the representative member of the first group). For instance, in one example, the processing system may deliver to the first user endpoint device a "dashboard"-style user interface (hereinafter also referred to simply as a "dashboard") that may show images of the representative members of the different groups. Seeing the images of the different representative members may help the host to quickly and easily assess how the material being presented is being received by the audience. Thus, in examples where audience members of additional groups have been selected in step 210 to serve as representatives for those groups, images of members of the audience members of the additional groups may also be presented in step 212 (e.g., at least an image of a second audience member may be presented simultaneously with the image of the first audience member). In some examples, the images may be accompanied by additional graphic representations such as bar charts, arrows, numerical or text annotations, and the like.

Figure 3:
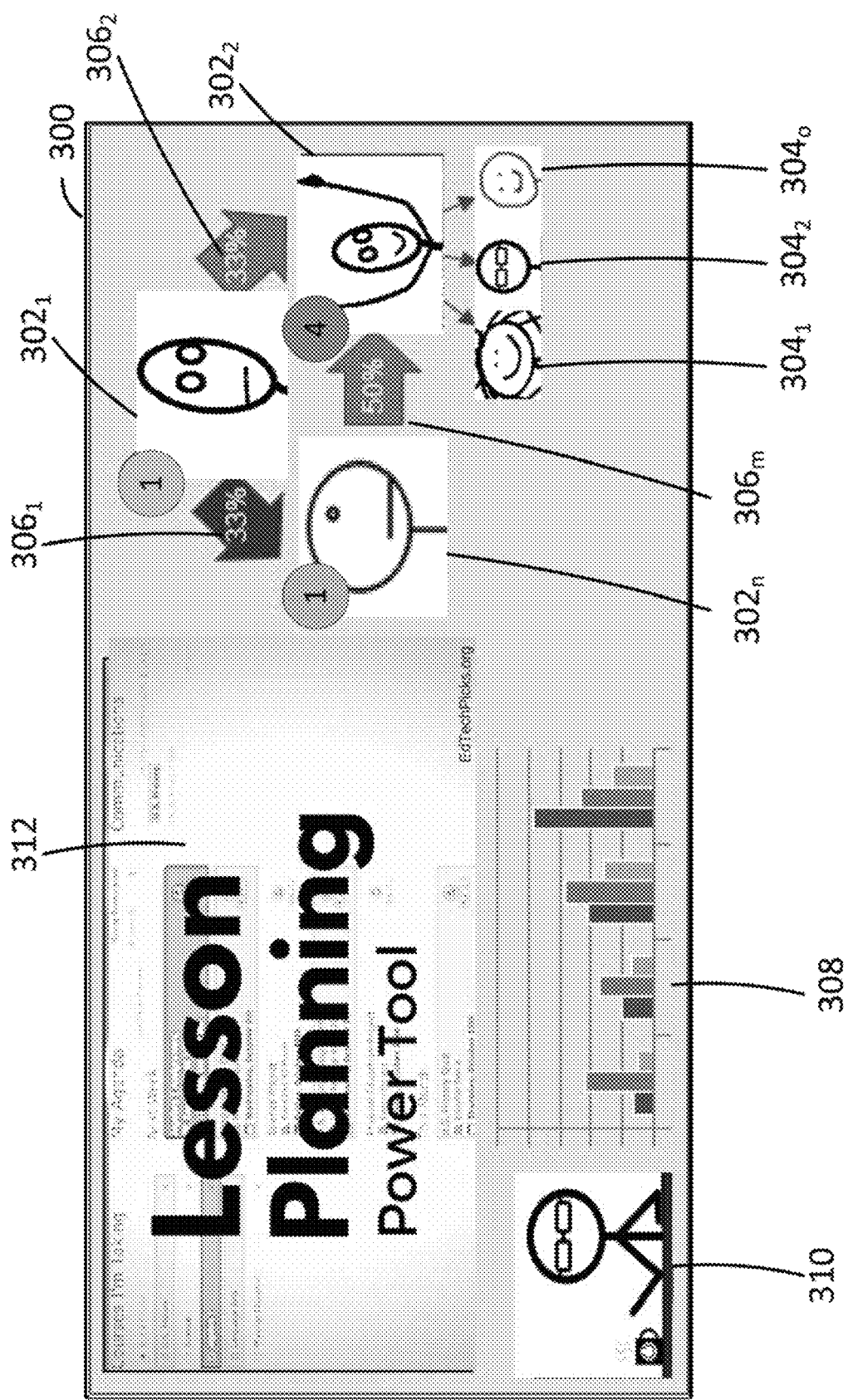
FIG. 3 illustrates an example dashboard-style graphical user interface (or simply "dashboard") that may be presented to a host of a remote broadcast event, according to examples of the present disclosure.

FIG. 3, for instance, illustrates an example dashboard-style graphical user interface 300 that may be presented to a host of a remote broadcast event, according to examples of the present disclosure. As illustrated, the dashboard 300 may include a plurality of audience image regions $302_1$-$302_n$ (hereinafter individually referred to as an "audience image region 302" or collectively referred to as "audience image regions 302") in which the processing system may provide images of representative audience members for different groups of audience members. For instance, in the example of FIG. 3, an audience image region $302_1$ shows a representative member of a "distracted" group, a second audience image region $302_2$ shows a representative member of an "engaged" group, and an nth audience image region $302_n$ shows a representative member of a "bored" group.

The images displayed in the audience image regions 302 may comprise live video feeds of the representative audience members, still images of the representative audience members extracted from video data contained in the data streams provided by the plurality of user endpoint devices, or computer-generated images designed to simulate the appearance of a member of the group (e.g., an avatar, emoticon, or the like whose facial expression is rendered to convey the reaction of the group).

The audience members whose images are displayed in the audience image regions 302 may change over time as different audience members may migrate between groups. For instance, an audience member chosen as a representative member of the "distracted" group may migrate to the "engaged" group over time, and a new representative member for the "distracted" group may be selected. The audience image regions 302 may or may not enable the host to also receive audio of the representative audience members.

In one example, a more granular view of any of the groups may be presented by selecting (e.g., clicking on) one of the audience image regions 302. For instance, FIG. 3 illustrates an example in which the audience image region $302_2$ (for the "engaged" group) has been selected. In this case, selecting an audience image region 302 for a group may cause the processing system to present images of additional audience members who are members of the group. For instance, selecting the audience image region $302_2$ for the "engaged" group may cause the processing system to present one or more smaller images $304_1$-$304_o$ of additional members of the "engaged" group. Thus, this feature may allow the event host to further explore any particular group of audience members and potentially gain a greater understanding of the reactions of that group (e.g., a large number of members of the "confused" group may appear to be sending text-based chat messages to each other asking if someone can explain a portion of the remote broadcast event). In this case, the presenting of the image of the first audience member in step 212 may further include steps of receiving a signal from the first user endpoint device indicating that the host wishes to see more of the first group (e.g., clicking on the image of the first audience member) and presenting an image of at least a second audience member from the first group on the first user endpoint device. For audience members whose cameras are disabled, computer-generated images of the audience members (e.g., avatars, emoticons, or the like) could be presented in place of live video images.

In another example, the selection of a group may be based on interactions of the host. For instance, the host may interact with the processing system in explicit ways, by clicking, touching, gesturing, selecting, or otherwise identifying a group or a single audience member via "zooming" on a display. The host may also passively interact with the audience or the processing system by moving her gaze to different areas of a screen or immersive display (if using a head-mounted virtual reality device), or by making a physical movement toward an audience segment in an immersive and ubiquitous display environment. Upon selection of a group, the processing system may either re-compute the processing described in step 208 for a smaller subset of audience members (e.g., those audience members who are within the selection range, visual area on the screen, or the like), or the processing system may further facet the existing groups (e.g., in the "distracted" group, what are the variances of the distraction and its magnitude for audience members?). All actions described herein may be repeated at different granularities (e.g., large moves, gestures, etc.) and with explicit polarity (e.g., moving closer, spreading with fingers, or identifying explicit members will constrain the subset of the audience, whereas moving further, pinching with fingers, or identifying larger swaths of the audience would expand the subset of the audience). In this example, the processing system may then accommodate the action of zooming on the display to encompass all or only one audience member both before or after the presentation of groups (e.g., as described in step 210).

The dashboard 300 may additionally include graphics to illustrate the quantities of the audience who belong to the different groups represented by the audience image regions 302 and/or the migration of audience members between the different groups represented by the audience image regions 302. The quantity of the audience who are estimated to belong to a given group may be indicated as a raw number of audience members in the group (e.g., x members of the "bored" group) or as a percentage of the total audience that belongs to the group (e.g., x percent of the total audience belongs to the "bored" group). Similarly assessed quantities (e.g., raw numbers or percentages) could also be used to illustrate the quantities of users who migrate to other groups.

For instance, FIG. 3 illustrates example graphical elements in the form of arrows $306_1$-$306_m$ (hereinafter individually referred to as an "arrow 306" or collectively referred to as "arrows 306") that connect audience image regions 302. In one example, the arrows are directed to point in the direction of audience migration. For instance, arrow $306_1$ is directed from audience image region $302_1$ to audience image region $302_n$, illustrating the migration of audience members from the "distracted" group to the "bored" group; arrow $306_2$ is directed from audience image region $302_1$ to audience image region $302_2$, illustrating the migration of audience members from the "distracted" group to the "engaged" group; and arrow $306_m$ is directed from audience image region $302_n$ to audience image region $302_2$, illustrating the migration of audience members from the "bored" group to the "engaged" group. The arrows may be annotated to indicate the quantities of audience members associated with the migrations. For instance, in the example illustrated in FIG. 3, thirty-three percent of the "distracted" group goes on to join the "bored" group, while thirty-three percent of the "distracted" group goes on to join the "engaged" group (the remaining thirty-four percent of the "distracted" group may remain in the "distracted" group). Similarly, fifty percent of the "bored" group may go on to join the "engaged" group. Like the images in the audience image regions 302, these numbers may change over time.

In one example, the dashboard 300 may also include an analytics region 308 that displays graphics derived from the estimates of the audience reactions. For instance, the analytic region 308 may display a bar chart indicating, for various time periods, the relative quantities of the audience members who belong to any of the groups defined in step 208. Thus, while the audience image regions 302 may help to visualize the current audience reactions, the analytic region 308 may help to visualize the audience reactions over time and to pinpoint any significant shifts in audience reactions (e.g., a "confused" group suddenly doubles in size, the size of the "bored" group gradually decreases, etc.).

In a further example, the dashboard 300 may additional include a host image region 310 and a screen sharing region 312. The host image region may present a live video image of the host (e.g., the user of the first user endpoint device), while the screen sharing region 312 may present a portion of the first user endpoint device's display (or media from another device or location) that is being presented on the plurality of user devices. The host image region 310 and screen sharing region 312 may allow the host to see what the audience members see on the displays of the plurality of user endpoint devices. Knowing what the audience members are seeing may also help to understand audience reactions. For instance, if the size of a "confused" group suddenly increases, and an image presented in the screen sharing region 312 does not match what the host is discussing, this may indicate that the host has forgotten to change the image in the screen sharing region 312 (e.g., move to the next slide of a slideshow presentation). Similarly, the size of a "distracted" group suddenly increases, the host may be able to see, from viewing his live image in the host image region 310, that there is something in his background or image that is causing the distraction (e.g., a bug on his head, a child behind him, etc.).

In yet another example, a simplified version of the dashboard 300 of FIG. 3 may be presented to the host during the event. Specifically, the host may be interested in only resultant analytics as displayed in the analytic region 308 or the system-derived audience image region $302_n$ and the changes in membership indicated by arrow $306_m$ In this simplified version, only the relevant display items would be visualized on the host's system, which may include a traditional display, an immersive system (e.g. augmented, virtual, or extended reality), or a ubiquitous display that moves to remain physically proximal to the host. Similarly, host interactions with the processing system may be adapted to the simplified display such that both passive (e.g., gaze) and active (e.g., pinch, zoom, select) activities are addressed with respect to the audience images, analytics, or presentation regions only.

Referring back to FIG. 2, once the image of the first audience member has been presented, the method 200 may then return to step 204, and the processing system may proceed as described above to continuously present the remote broadcast event and to estimate the audience members' reactions while presenting the remote broadcast event. Thus, steps 204-212 may be repeated any number of times until presentation of the remote broadcast event concludes (e.g., the remote broadcast event may come to a scheduled end, or the host may terminate the remote broadcast event before a scheduled end).

The method 200 therefore allows the host (e.g., presenter or performer) of a live, remote broadcast event to receive real time audience feedback, just as the host would receive if he or she were presenting in front of an in-person audience. This may help the host to feel more connected (and, potentially, more comfortable) with the audience, to better gauge the audience's reaction to the material being presented, and/or to adapt the presentation to the audience's reactions. In one example, the host may view the feedback through a head mounted display or set of Internet-connected glasses, which may allow the feedback to be presented in a manner that has the "feel" of an in-person audience. However, in other examples, the feedback could be presented on a simplified audience overlay on an augmented reality display.

For instance, if the remote broadcast event comprises a virtual stand-up comedy show, examples of the present disclosure could help the comedian to determine when his jokes are making the audience laugh, when his jokes are falling flat, and the like. If it appears that a particular line of jokes is failing to engage the audience, the comedian may move on to a different line of jokes in an effort to improve the engagement.

If the remote broadcast event comprises a virtual class (e.g., a college class), examples of the present disclosure could help the professor to determine when members of the class seem confused or disengaged. If it appears that members of the class are confused, the professor could try presenting the material in a different manner to increase the comprehension of the material by the class.

Further examples of the present disclosure may include a means for the event host to engage audience members more directly. For instance, the event host may identify a particular member of an audience group who the host may wish to engage further (e.g., as might happen during a virtual stand-up comedy show, or a virtual class in which an audience member may wish to ask a question). The event host may be able to selectively mute or unmute a selected audience member, present a video feed of the selected audience member to other audience members, and the like.

The audience feedback that is presented, including audience images, graphics, and the like, may also be stored as part of a recording of the remote broadcast event. This may allow an event host, organizer, or others to go back and review the audience feedback at a later time (e.g., as opposed to in real time as the remote broadcast event is being presented).

In further examples, the method 200 could be used to aid advertisers in determining where to place advertising material during a remote broadcast event. For instance, the optimal time to place advertising material may be when a threshold percentage of the audience appears to be paying attention. Thus, the method 200 could be used to determine the best times to present real-time advertising during a remote broadcast event.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for providing feedback from a remote audience in a manner that simulates live audience feedback, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 405 for providing feedback from a remote audience in a manner that simulates live audience feedback (e.g., a software program comprising computer-executable instructions) can be loaded into memory 404 and executed by hardware processor element 402 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for providing feedback from a remote audience in a manner that simulates live audience feedback (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
presenting, by a processing system including at least one processor, a remote broadcast event by delivering content from a first user endpoint device of an event host to a plurality of user endpoint devices of a plurality of audience members;
estimating, by the processing system, a plurality of reactions of the plurality of audience members, based on streams of data received from the plurality of user endpoint devices;
grouping, by the processing system, the plurality of audience members into a plurality of groups, based on the plurality of reactions, wherein each group of the plurality of groups is associated with a different reaction of the plurality of reactions, and wherein each audience member of the plurality of audience members who is a member of the each group was estimated to demonstrate a common reaction of the plurality of reactions, wherein the common reaction is associated with the each group;
selecting, by the processing system for a first group of the plurality of groups, a first audience member from the first group to be representative of the first group;
presenting, by the processing system to the first user endpoint device, an image of the first audience member;
selecting, by the processing system for a second group of the plurality of groups, a second audience member from the second group to be representative of the second group;
presenting, by the processing system to the first user endpoint device, an image of the second audience member, simultaneously with the presenting the image of the first audience member; and
presenting, by the processing system, a graphic to indicate a quantity of the plurality of audience members who moved from the first group to the second group over time.

2. The method of claim 1, further comprising:
receiving, by the processing system, from the first user endpoint device, a signal indicating that the event host wishes to view more of the first group; and
presenting, by the processing system, an image of a second audience member from the first group on the first user endpoint device.

3. The method of claim 2, wherein the presenting the image of the second audience member from the first group comprises displaying a video of the second audience member from the first group.

4. The method of claim 1, wherein the image of the first audience member comprises a video or a photo image of the first audience member.

5. The method of claim 1, wherein the image of the first audience member comprises a computer-generated image of the first audience member which simulates a facial expression or a behavior that conveys a first reaction.

6. The method of claim 1, wherein each user endpoint device of the first user endpoint device and the plurality of user endpoint devices includes a camera, and the streams of data include video data of the plurality of audience members.

7. The method of claim 6, wherein the estimating comprises:
performing, by the processing system, an image analysis of the video data in order to detect facial expressions of the plurality of audience members; and
inferring, by the processing system, the plurality of reactions based on the facial expressions.

8. The method of claim 1, wherein the streams of data include text-based messages exchanged by the plurality of audience members.

9. The method of claim 8, wherein the estimating comprises:
performing, by the processing system, a sentiment analysis on the text-based messages to extract expressed sentiments from the text-based messages; and
inferring, by the processing system, the plurality of reactions based on the expressed sentiments.

10. The method of claim 1, wherein each user endpoint device of the first user endpoint device and the plurality of user endpoint devices includes a microphone, and the streams of data include audio data of the plurality of audience members.

11. The method of claim 10, wherein the estimating comprises:
performing, by the processing system, an audio analysis of the audio data in order to detect sounds made by the plurality of audience members; and
inferring, by the processing system, the plurality of reactions based on the sounds.

12. The method of claim 10, wherein the estimating comprises:
performing, by the processing system, a speech recognition analysis of the audio data in order to detect words spoken by the plurality of audience members; and
inferring, by the processing system, the plurality of reactions based on the words.

13. The method of claim 1, further comprising:
presenting, by the processing system, a bar chart to the first user endpoint device, wherein the bar chart illustrates, for the first audience member, a membership history of the first audience member within the plurality of groups.

14. The method of claim 1, further comprising:
presenting, by the processing system to the first user endpoint device, audio of the first audience member.

15. The method of claim 1, wherein the streams of data include video and audio data of a live audience comprising multiple audience members in addition to the plurality of audience members.

16. The method of claim 15, wherein the estimating, grouping, selecting, and presenting are further based on the video and audio data of the live audience.

17. A non-transitory computer-readable medium storing instructions which, when executed by a processing system including at least one processor, cause the processing system to perform operations, the operations comprising:
presenting a remote broadcast event by delivering content from a first user endpoint device of an event host to a plurality of user endpoint devices of a plurality of audience members;
estimating a plurality of reactions of the plurality of audience members, based on streams of data received from the plurality of user endpoint devices;
grouping the plurality of audience members into a plurality of groups, based on the plurality of reactions, wherein each group of the plurality of groups is associated with a different reaction of the plurality of reactions, and wherein each audience member of the plurality of audience members who is a member of the each group was estimated to demonstrate a common reaction of the plurality of reactions, wherein the common reaction is associated with the each group;
selecting, for a first group of the plurality of groups, a first audience member from the first group to be representative of the first group;
presenting, to the first user endpoint device, an image of the first audience member;
selecting, for a second group of the plurality of groups, a second audience member from the second group to be representative of the second group;
presenting, to the first user endpoint device, an image of the second audience member, simultaneously with the presenting the image of the first audience member; and
presenting a graphic to indicate a quantity of the plurality of audience members who moved from the first group to the second group over time.

18. A device comprising:
a processing system including at least one processor; and
a non-transitory computer-readable medium storing instructions which, when executed by the processing system, cause the processing system to perform operations, the operations comprising:
presenting a remote broadcast event by delivering content from a first user endpoint device of an event host to a plurality of user endpoint devices of a plurality of audience members;
estimating a plurality of reactions of the plurality of audience members, based on streams of data received from the plurality of user endpoint devices;
grouping the plurality of audience members into a plurality of groups, based on the plurality of reactions, wherein each group of the plurality of groups is associated with a different reaction of the plurality of reactions, and wherein each audience member of the plurality of audience members who is a member of the each group was estimated to demonstrate a common reaction of the plurality of reactions, wherein the common reaction is associated with the each group;
selecting, for a first group of the plurality of groups, a first audience member from the first group to be representative of the first group;
presenting, to the first user endpoint device, an image of the first audience member;
selecting, for a second group of the plurality of groups, a second audience member from the second group to be representative of the second group;
presenting, to the first user endpoint device, an image of the second audience member, simultaneously with the presenting the image of the first audience member; and
presenting a graphic to indicate a quantity of the plurality of audience members who moved from the first group to the second group over time.

19. The non-transitory computer-readable medium of claim 17, wherein the operations further comprise:
presenting a bar chart to the first user endpoint device, wherein the bar chart illustrates, for the first audience member, a membership history of the first audience member within the plurality of groups.

20. The device of claim 18, wherein the operations further comprise:
    presenting a bar chart to the first user endpoint device, wherein the bar chart illustrates, for the first audience member, a membership history of the first audience member within the plurality of groups.

* * * * *